United States Patent [19]

Fuse et al.

[11] Patent Number: 4,875,823
[45] Date of Patent: Oct. 24, 1989

[54] ROBOT APPARATUS

[75] Inventors: Genzo Fuse; Hiroshi Miwa; Yoshinobu Kawasaki, all of Sayama, Japan

[73] Assignee: Honda Giken Kogyo Kabushiki Kaisha, Tokyo, Japan

[21] Appl. No.: 117,229

[22] Filed: Nov. 6, 1987

[30] Foreign Application Priority Data

Nov. 8, 1986 [JP] Japan ............................ 61-266157
Nov. 20, 1986 [JP] Japan ............................ 61-277611
Nov. 25, 1986 [JP] Japan ............................ 61-180598[U]

[51] Int. Cl.⁴ .................... B25J 5/02; B25J 17/00
[52] U.S. Cl. .................... 414/735; 104/139; 105/29.1; 414/744.4; 901/7; 901/28; 901/29
[58] Field of Search ............ 414/730, 735, 744 A, 414/680, 749, 751, 744.4, 744.8; 901/1, 7, 15, 22, 25, 26, 28, 29; 104/48, 139, 140; 105/29.1

[56] References Cited

U.S. PATENT DOCUMENTS

| | | | |
|---|---|---|---|
| 1,000,742 | 8/1911 | McKay | 104/139 |
| 3,522,838 | 8/1970 | Ott | 414/744 |
| 3,792,782 | 2/1974 | Melton | 901/22 X |
| 4,273,506 | 6/1981 | Thomson et al. | |
| 4,378,959 | 4/1983 | Susnjara | 414/735 X |
| 4,600,358 | 7/1986 | Graf | 901/16 X |

FOREIGN PATENT DOCUMENTS

| | | |
|---|---|---|
| 0048955 | 9/1982 | European Pat. Off. |
| 0180560 | 5/1986 | European Pat. Off. |
| 58-33579 | 2/1983 | Japan |
| 59-97877 | 6/1984 | Japan |
| 60-85284 | 5/1985 | Japan |
| 30111 | of 1896 | United Kingdom ............... 104/139 |
| 2102763 | 2/1983 | United Kingdom ............... 901/29 |
| 2085393 | 6/1985 | United Kingdom |
| 2106076 | 7/1985 | United Kingdom |
| 2160827 | 1/1986 | United Kingdom |

Primary Examiner—Robert J. Spar
Assistant Examiner—Donald W. Underwood
Attorney, Agent, or Firm—Birch, Stewart, Kolasch & Birch

[57] ABSTRACT

A robot apparatus includes a robot having a swingable arm, a wrist mechanism mounted on the arm, and a running mechanism for displacing the robot in a prescribed direction. The wrist mechanism is coupled to an attachment member by an actuator having a fluid cylinder substantially parallel to the arm. When a component to be attached to a workpiece is held by a jig mounted on the wrist mechanism, the fluid cylinder is actuated to lift the wrist mechanism in order to correct the jig for the distance it is lowered due to the weight of the component. The wrist mechanism includes a bracket mounted on the arm by a support shaft, the bracket and the support shaft having fluid passages for supplying fluid under pressure to a torque actuator disposed in the bracket. The running mechanism is disposed in a pit defined in a floor on which the robot apparatus is located.

20 Claims, 8 Drawing Sheets

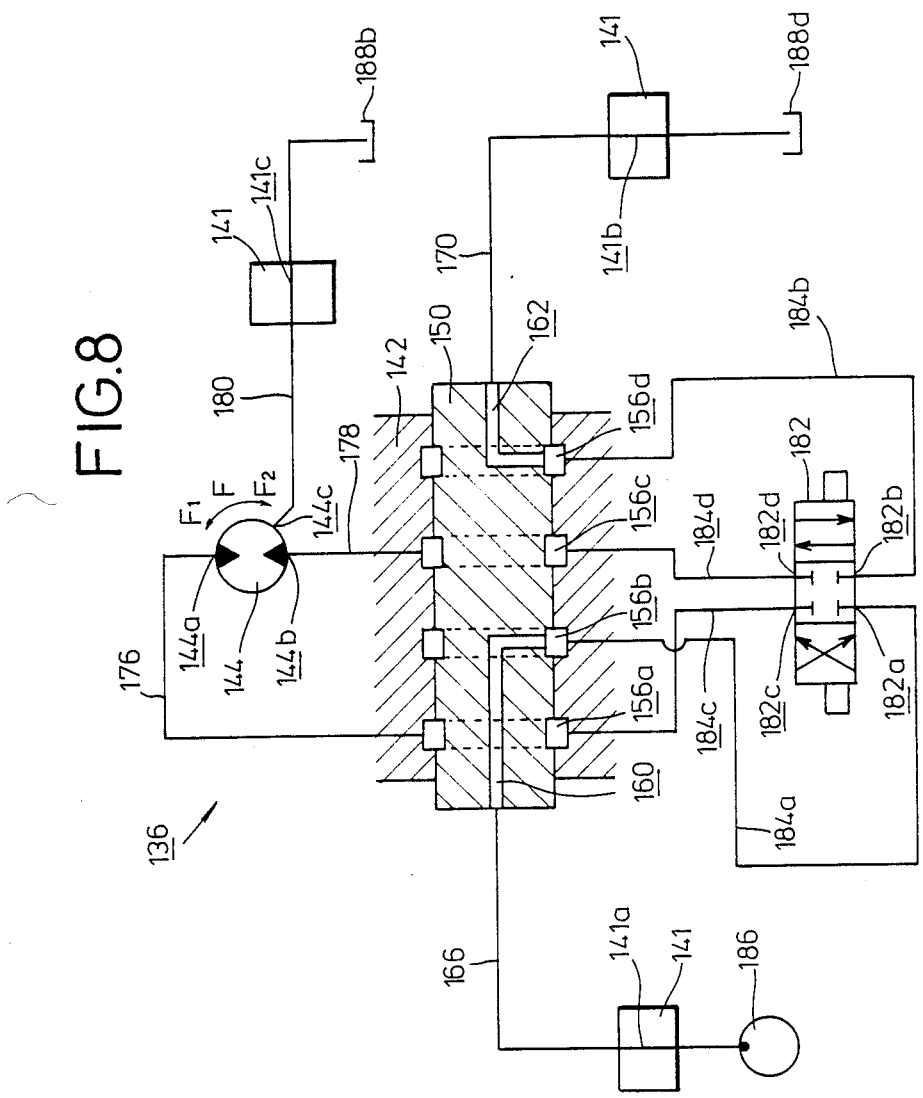

ROBOT APPARATUS

BACKGROUND OF THE INVENTION

The present invention relates to a robot apparatus, and more particularly to a robot apparatus for installing parts on a workpiece, the robot apparatus including a robot body having an arm to which a wrist mechanism is rotatably attached through a support shaft having a passage for supplying a fluid under pressure, the wrist mechanism being angularly movable by an actuator, and a running mechanism disposed in a pit defined in a floor for displacing the robot body, the robot apparatus being of a relatively simple arrangement capable of automatically installing parts automatically and accurately, and effectively utilizing a relatively small space for installtion.

Heretofore, production systems have widely been employed which include a plurality of working stations disposed along an assembly line for installing various parts on a workpiece such as an automobile body with installing mechanisms such as robots. Each of the working or installing stations has a robot for attaching parts such as passenger seats to an automobile body being conveyed, a jig stocker for storing jigs to be attached to the distal end of the robot for holding parts to be installed on the automobile body, and a workpiece stocker for storing an array of parts such as passenger seats.

Various robots to be disposed in the working stations have been developed in order to hold different types of parts. One such robot is disclosed in Japanese Laid-Open Patent Publication No. 59-97877. The disclosed robot basically includes a base table displaceable in a prescribed direction for attaching a passenger seat, particularly a front seat, to an automobile body, a first swingable arm disposed above the base table, a second arm swingably supported on the distal end of the first arm, and a grip hand mounted on the distal end of the second arm through a rotatable wrist mechanism. The seat is held by the hand, and the first and second arms are actuated to install the seat on the automobile body. The wrist mechanism houses therein a fluid-pressure-operated rotative drive source for turning the wrist mechanism including the hand.

Where the disclosed robot is employed to mount a relatively heavy component such as a rear seat in an automobile body, the first and second arms and the grip hand are caused to flex to a considerable degree due to the weight of the component to be installed and also the weight of the arms and the grip hand. Therefore, the component to be attached may not be held in a desired position, and it is difficult to automatically install the component on the automobile body because the component held by the grip hand suffers a positional deviation or error. To avoid this difficulty, a component has to be positionally aligned each time it is installed.

With the rotative drive source accommodated in the wrist mechanism for turning the hand, there must be provided a pipe for supplying a fluid to the rotative driver source and a directional control valve such as a servovalve disposed in the pipe for turning the wrist mechanism in a desired direction. The procedure of attaching the pipe and the valve is considerably complex. If the number of steps required for attaching the pipe and the valve is increased, an error may be caused in the installation of the pipe and the valve. The pipe and the valve make the robot itself highly complicated, and places a substantial limitation on the movement of the robot.

A running mechanism is also required to displace the robot in a directed direction. Such running mechanisms are disclosed in Japanese Laid-Open Patent Publication No. 58-33579 and Japanese Laid-Open Utiilty Model Publication No. 60-85284. More speciically, the former publication shows a running device for conveying in a prescribed direction a device for automatically mounting a spare tire on an automobile body. The latter publication shows a running mechanism for delivering a device for installing a door on an automobile in order to convey the installing device in a prescribed direction.

The device for automatically mounting a spare tire on an automobile body or the device for installing a door on an automobile is generally disposed on a floor. Therefore, the running device or mechanism itself takes up a large space, and the space around a working station where the mounting or installing device is positioned cannot effectively be utilized.

SUMMARY OF THE INVENTION

It is a general object of the present invention to provide a robot apparatus including a wrist mechanism held by a link mechanism including an actuator and coupled to an arm by a support shaft with a passage defined therein for supplying a fluid to a rotative drive source for actuating the wrist mechanism, and a running mechanism disposed in a pit defined in a floor for moving a robot in a prescribed direction, so that the robot apparatus is simple in structure, can hold and deliver heavy objects or parts without causing a robot hand to suffer a positional deviation or error, can automatically and accurately install various parts, and can effectively utilize a small space for installation.

Another object of the present invention is to provide a robot apparatus including a robot having an attachment member, an arm swingably mounted on the attachment member, a wrist mechanism mounted on the arm, a connecting member interconnecting the attachment member and the wrist mechanism, and a running mechanism for displacing the robot in a prescribed direction, the connecting member including an actuator and a link coupled thereto for displacing the wrist mechanism with the actuator.

Still another object of the present invention is to provide a robot apparatus, wherein the actuator includes a cylinder and the link includes a piston rod of the cylinder.

A further object of the present invention is to provide a robot apparatus, further including an actuator connected to an intermediate portion of the arm and mounted on the robot, and a moving member movable by the actuator for swinging the arm.

A further object of the present invention is to provide a robot apparatus, further including a rotative drive source, a holder rotatable by the rotative drive source, the attachment member being mounted on the holder, and a position detector for detecting an angular position of the holder to stop the holder in a desired position.

A yet further object of the present invention is to provide a robot apparatus, wherein the wrist mechanism includes a bracket coupled to the arm, a rotative drive source disposed in the bracket, a rotatable body rotatable by the rotative drive source, and a support shaft by which the bracket is supported on the arm, the support shaft and the bracket having fluid passages defined therein for supplying fluid under pressure to actuate the rotative drive source.

A still further object of the present invention is to provide a robot apparatus, further including a directional control valve for selecting desired ones of the fluid passages, and means on the bracket for attaching the directional control valve.

A yet still further object of the present invention is to provide a robot apparatus, wherein the attaching means has passages communicating respectively with ports of the directional control valve.

Yet another object of the present invention is to provide a robot apparatus, wherein the directional control valve includes a servovalve.

Yet another object of the present invention is to provide a robot apparatus, wherein the rotative drive source includes a torque actuator operable by fluid under pressure.

Still another object of the present invention is to provide a robot apparatus, wherein the support shaft is fitted in the bracket, the support shaft having a plurality of grooves defined therein, the bracket having a plurality of passages defined therein and communicating with the grooves, the grooves and the passages jointly providing the fluid passages.

A further object of the present invention is to provide a robot apparatus, wherein the grooves are kept hermetically sealed in a fluid-tight manner.

A still further object of the present invention is to provide a robot apparatus, wherein the support shaft is rotatably coupled to the arm.

A still further object of the present invention is to provide a robot apparatus, wherein the running mechanism includes a base table, at least one displaceable running table, driver means for moving the at least one displaceable running table, and an attachment member by which the robot is mounted on the at least one displaceable running table, the base table, the at least one displaceable running table and the driver means being disposed in a pit defined in a floor on which the robot apparatus is disposed.

A yet still further object of the present invention is to provide a robot apparatus, wherein the running mechanism further includes a guide rail extending in a prescribed direction on the base table, the running table being displaceable along the guide rail.

A yet still further object of the present invention is to provide a robot apparatus, further including a shield member closing an upper open end of the pit and lying substantially flush with the floor.

A yet further object of the present invention is to provide a robot apparatus, wherein the driver means includes a rotative drive source mounted on a side of the base table and having a drive shaft, a pinion coupled to the drive shaft, and a rack fixed to the base table and meshing with the pinion.

A yet further object of the present invention is to provide a robot apparatus, wherein the rotative drive source includes a fluid pressure motor operable by fluid under pressure.

Yet another object of the present invention is to provide a robot apparatus, wherein the running mechanism further includes leveler bolts by which the base table is positioned substantially horizontally.

Still yet another object of the present invention is to provide a robot apparatus, wherein the running mechanism further includes a pair of support plates vertically mounted on the at least one displaceable running table, the attachment member being coupled to the at least one displaceable running table by the support plates.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 8 is a circuit diagram of a hydraulic pressure circuit for actuating the wrist mechanism shown in FIGS. 6 and 7.

DETAILED DESCRIPTION OF THE PREFERRED EMBODIMENT

Figure 1:
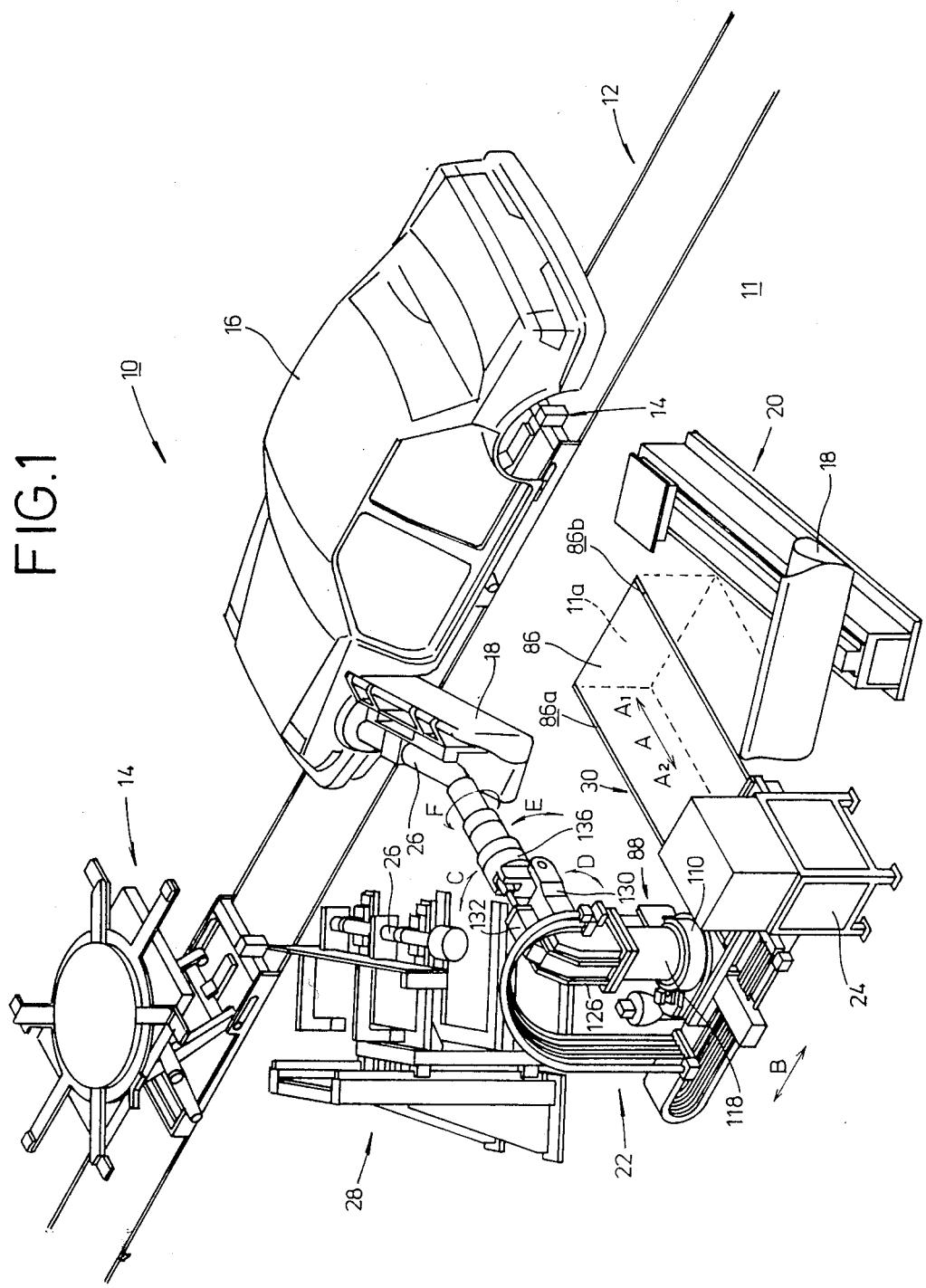
FIG. 1 is a perspective view of a working station in which a robot apparatus according to the present invention is disposed.

FIG. 1 shows a working station including a robot apparatus, generally denoted at 10, according to the present invention. In the working station 10, a workpiece 18 such as a rear passenger seat is installed in an automobile body 16 which is conveyed in a prescribed direction on and along an assembly line 12 by a conveyor device 14.

The work station 10 includes, on a floor 11, a work stocker 20 for storing an array of rear seats 18, a robot apparatus 22 for installing the rear seats 18 stored in the work stocker 20 one by one in the automobile body 16, a robot controller 24 for controlling the robot apparatus 22, and a jig stocker 28 for storing an array of jigs 26 to be selectively attached to the distal end of the robot apparatus 22 for holding a rear seat 18.

Figure 2:
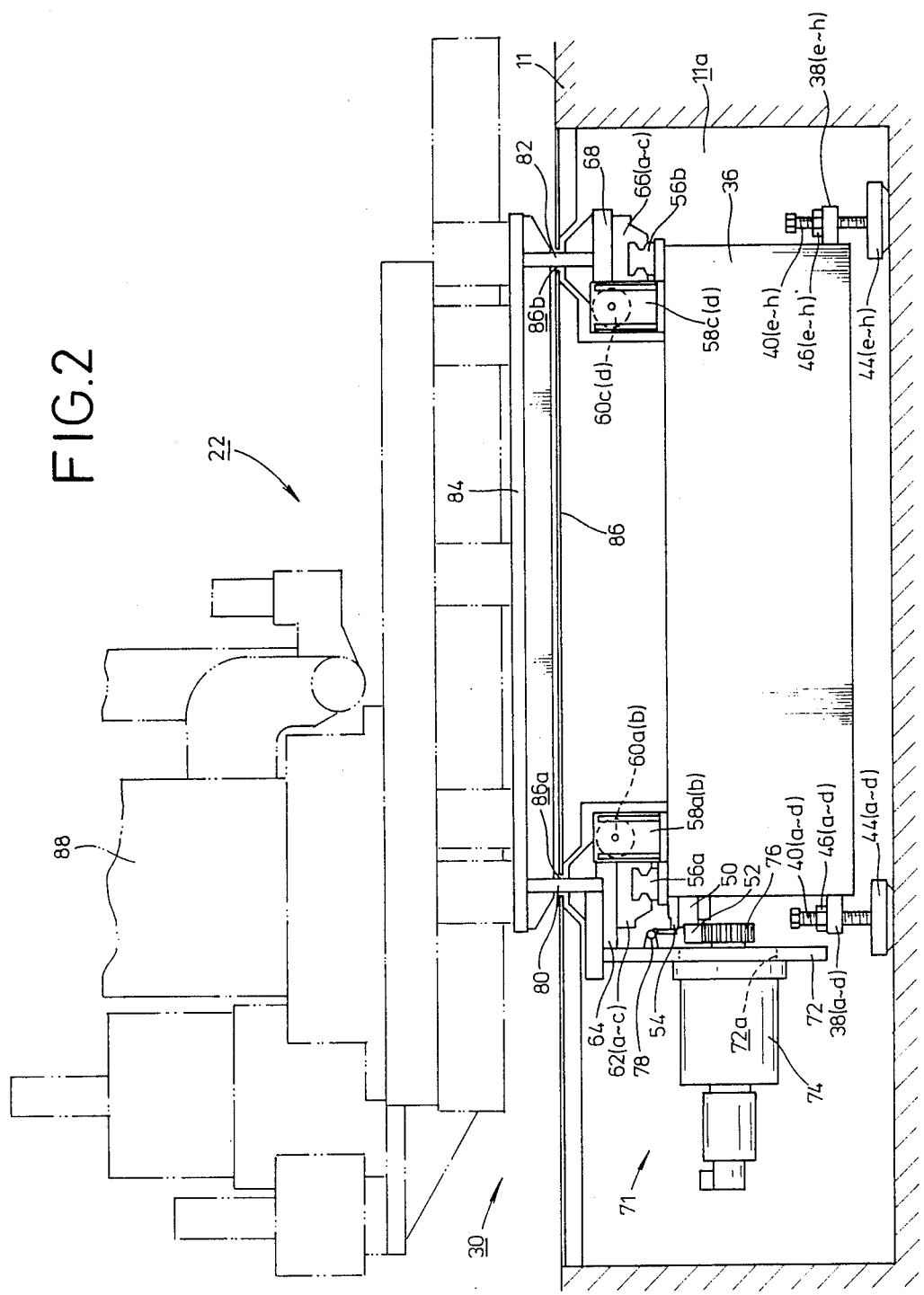
FIG. 2 is a front elevational view of a running mechanism of the robot apparatus.
Figure 3:
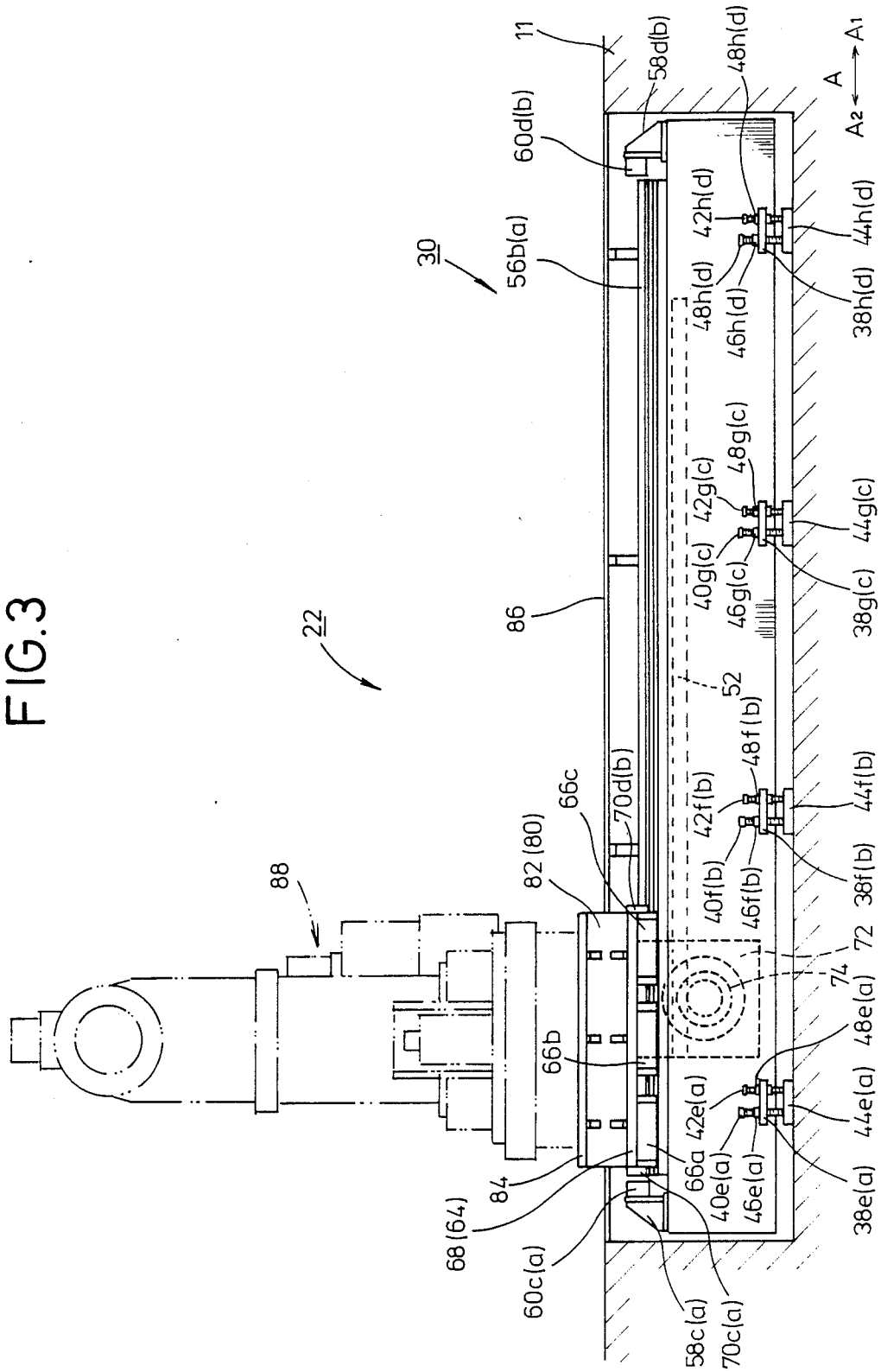
FIG. 3 is a side elevational view of the running mechanism shown in FIG. 2.

As shown in FIGS. 2 and 3, the robot apparatus 22 has a running mechanism 30 movable in the direction of the arrow A. The running mechanism 30 includes a base table 36 disposed in a pit 11a defined in the floor 11. The base table 36 has integral horizontal plates 38a through 38d extending from a side thereof, and integral horizontal plates 38e through 38h extending from an opposite side thereof. Each of the plates 38a through 38h has threaded and plain holes (not shown) defined therein side by side. As shown in FIG. 3, leveler bolts 40a through 40h are threaded respectively in the threaded holes of the plates 38a through 38h for supporting the base table 36 horizontally. Anchor bolts 42a through 42h are fitted respectively in the plain holes of the plates 38a through 38h for fixing the base table 36. The leveler bolts 40a through 40h have tip ends engaging receiver plates 44a through 44h, respectively, placed on the bottom of the pit 11a, and the anchor bolts 42a through 42h are threaded in the respective receiver plates 44a through 44h, for keeping the base table 36 horizontally at a prescribed height. More specifically, nuts 46a through 46h are threaded over the respective leveler bolts 40a through 40h and nuts 48a through 48h are threaded over the respective anchor bolts 42a through 42h. The nuts 46a through 46h and 48a through 48h serve to prevent the leveler bolts 40a through 40h and the anchor bolts 42a through 42h from being turned undesirably due to vibration of the running mechanism 30.

In FIGS. 2 and 3, a rack 52 is mounted on an upper portion of a side of the base table 36 by means of a rack attachment 50, the rack 52 extending in the direction of the arrow A and meshing with a pinion (described later). A limit switch 54 is mounted on one end of the side of the base table 36 on which the rack 52 is disposed. The limit switch 54 serves to detect displacement of a running table (described later).

A pair of substantially parallel guide rails 56a, 56b are mounted on the upper surface of the base table 36. Angles 58a through 58d are fixed to the upper surface of the base table 36 near the opposite ends of the guide rails 56a, 56b, with stopper blocks 60a through 60d attached respectively to the angles 58a through 58d.

Sliding members 62a through 62c spaced at intervals are held in engagement with the guide rail 56a. A first running table 64 is fixed to the upper surfaces of the sliding members 62a through 62c. Likewise, sliding members 66a through 66c spaced at intervals are held in engagement with the guide rail 56b. A second running table 68 is fixed to the upper surfaces of the sliding members 66a through 66c. Plates 70a, 70b are attached to the respective opposite ends of the first running table 64 for abutment against the stopper blocks 60a, 60b, respectively. Plates 70c, 70d are attached to the respective opposite ends of the second running table 68 for abutment against the stopper blocks 60c, 60d, respectively.

A motor attachment plate 72 is firmly secured to a substantially central portion of a side of the first running table 64. The motor attachment plate 72 extends downwardly from the side of the first running table 64, and has a hole 72a of a relatively large diameter defined substantially centrally therein. On one side of the motor attachment plate 72, there is mounted a hydraulic motor 74 as driver means 71 for the running tables 64, 68. The hydraulic motor 74 has a drive shaft projecting through the hole 72a of the motor attachment plate 72 and coupled to a pinion 76 meshing with the rack 52. A kicker member 78 is mounted on an upper portion of the motor attachment plate 72 for triggering the limit switch 54 on the base table 36.

Support plates 80, 82 are attached substantially centrally to the upper surfaces of the first and second running tables 64, 68, respectively. The support plates 80, 82 project from the first and second running tables 64, 68 upwardly of the floor 11, and a mounting plate 84 extends between and is attached to the upper ends of the support tables 80, 82. Thus, the first and second running tables 64, 68 are integrally joined to each other by the support plates 80, 82 and the mounting plate 84.

As can readily be seen from FIG. 2, the base table 36, the guide rails 56a, 56b, the first running table 64, the second running table 68, and the driver means 71 are disposed within th pit 11a.

The upper open end of the pit 11a is closed by a shield plate 86. The shield plate 86 lies substantially flush with the floor 11. The shield plate 86 has recesses 86a, 86b in and along which the support plates 80, 82 can be displaced in the direction of the arrow A together with the first and second running tables 64, 68.

Figure 4:
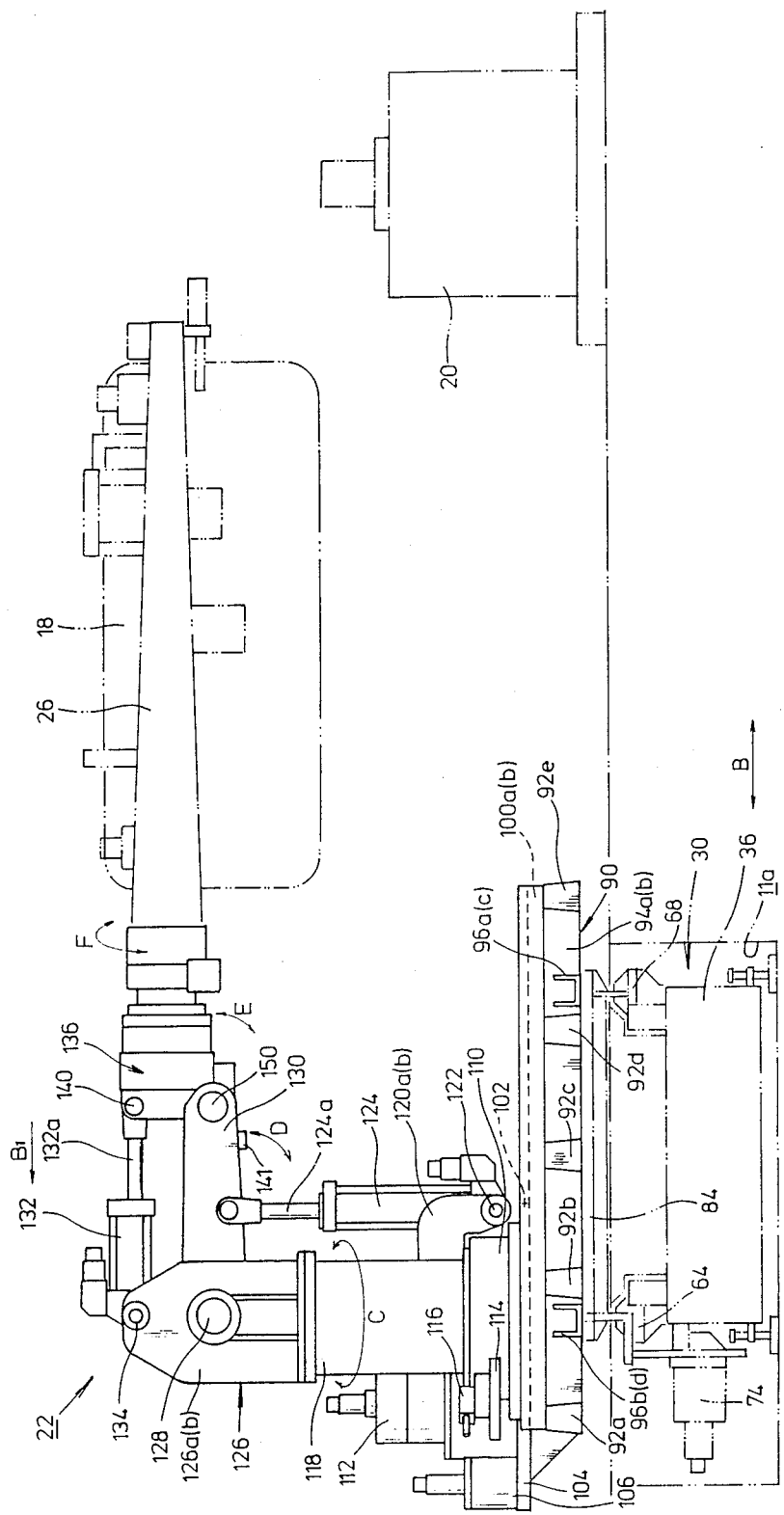
FIG. 4 is a front elevational view of a robot of the robot apparatus.
Figure 5:
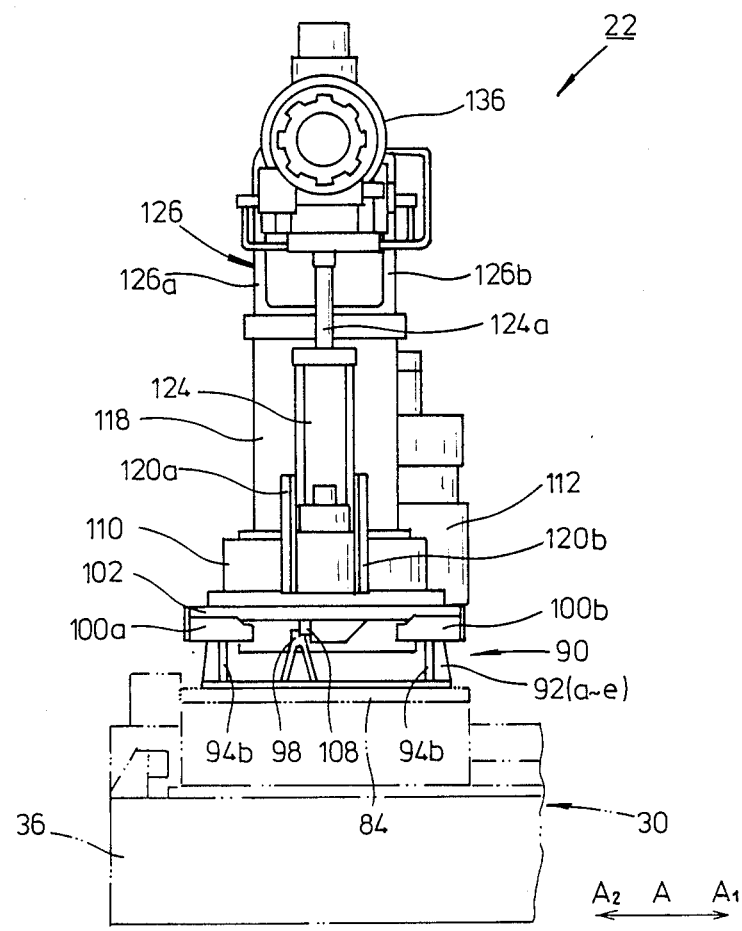
FIG. 5 is a side elevational view of the robot illustrated in FIG. 4.

The mounting plate 84 of the running mechanism 30 supports a robot 88 on its upper surface. As shown in FIGS. 4 and 5, the robot 88 has a base 90 including blocks 92a through 92e spaced at intervals and a pair of elongate plates 94a, 94b interconnecting the blocks 92a through 92e. Upwardly opening channel-shaped angles 96a through 96d are attached to the plates 94a, 94b. The angles 96a through 96d have respective holes defined substantially centrally therein. The base 90 is fixed to the mounting plate 84 by bolts (not shown) extending through the holes of the angles 96a through 96d.

Between the plates 94a, 94b, there extends a rack 98 from the block 92a to the block 92e substantially parallel to the plates 94a, 94b. A pair of guide members 100a, 100b are mounted on the upper surfaces of the blocks 92a through 92e substantially aligned with the rack 98, and a sliding member 102 is displaceably mounted on the guide members 100a, 100b. On one end of the sliding member 102, there is mounted a hydraulic motor 106 through an attachment plate 104, the hydraulic motor 106 having a drive shaft coupled to a pinion 108 through a bevel gear (not shown) below the sliding member 102. The pinion 108 meshes with the rack 98. Therefore, when the hydraulic motor 106 is actuated, the sliding member 102 is guided by the guide members 100a, 100b to move in the direction of the arrow B.

To the upper surface of the sliding member 102, there is fixed a base 110 on which a turning motor 112 is mounted at one end. A position detector 116 is attached to the base 110 by a plate 114, and a tubular holder 118 is also mounted on the base 110, the tubular holder 118 being rotatable in the direction of the arrow C by the turning motor 112. The position detector 116 detects the angular position of the holder 118 so that the holder 118 can be stopped at a desired angular position. A pair of support members 120a, 120b of bent configuration are attached at one end thereof to a lower portion of the peripheral surface of the holder 118. A first cylinder 124 is swingably supported on the other ends of the support members 120a, 120b by means of a pin 122 extending between the support members 120a, 120b. The first cylinder 124 has a piston rod 124a extending upwardly and having a distal end engaging an arm (described later).

An attachment member 126 is integrally mounted on the upper surface of the holder 118. As shown in FIG. 5, the attachment member 126 is substantially in the shape of a U which is upwardly open and includes parallel spaced side plates 126a, 126b having respective holes defined substantially centrally therein. An arm 130 is swingably supported on a pin 128 extending through the holes in the side plates 126a, 126b and hence supported thereby. The arm 130 has an intermediate portion coupled to the piston rod 124a of the first cylinder 124. Therefore, the arm 130 is swingable about the pin 128 in the direction of the arrow D in response to actuation of the first cylinder 124. A second cylinder 132 is swingably supported on the distal end of the attachment member 126 by means of a pin 134. As shown in FIG. 4, the second cylinder 132 extends substantially parallel to the arm 130.

A wrist mechanicam 136 is angularly movably supported on the distal end of the arm 130. The second cylinder 132 has a piston rod 132a with its distal end pivotably coupled to the wrist mechanism 136. The arm 130 and the piston rod 132a are pivotably coupled to the wrist mechanism 136 by a support pin (described later) and a pin 140, respectively. The attachment member 126 extending upwardly, the arm 130 extending horizontally, the wrist mechanism 136 having a vertical member, and the cylinder 132 oriented horizontally jointly constitute a parallel-link mechanism. A joint block 141 is attached to the arm 130 in the vicinity of the distal end thereof, and has passages 141a, 141b, 141c of a bent shape defined therein (see FIGS. 6 and 7).

Figure 6:
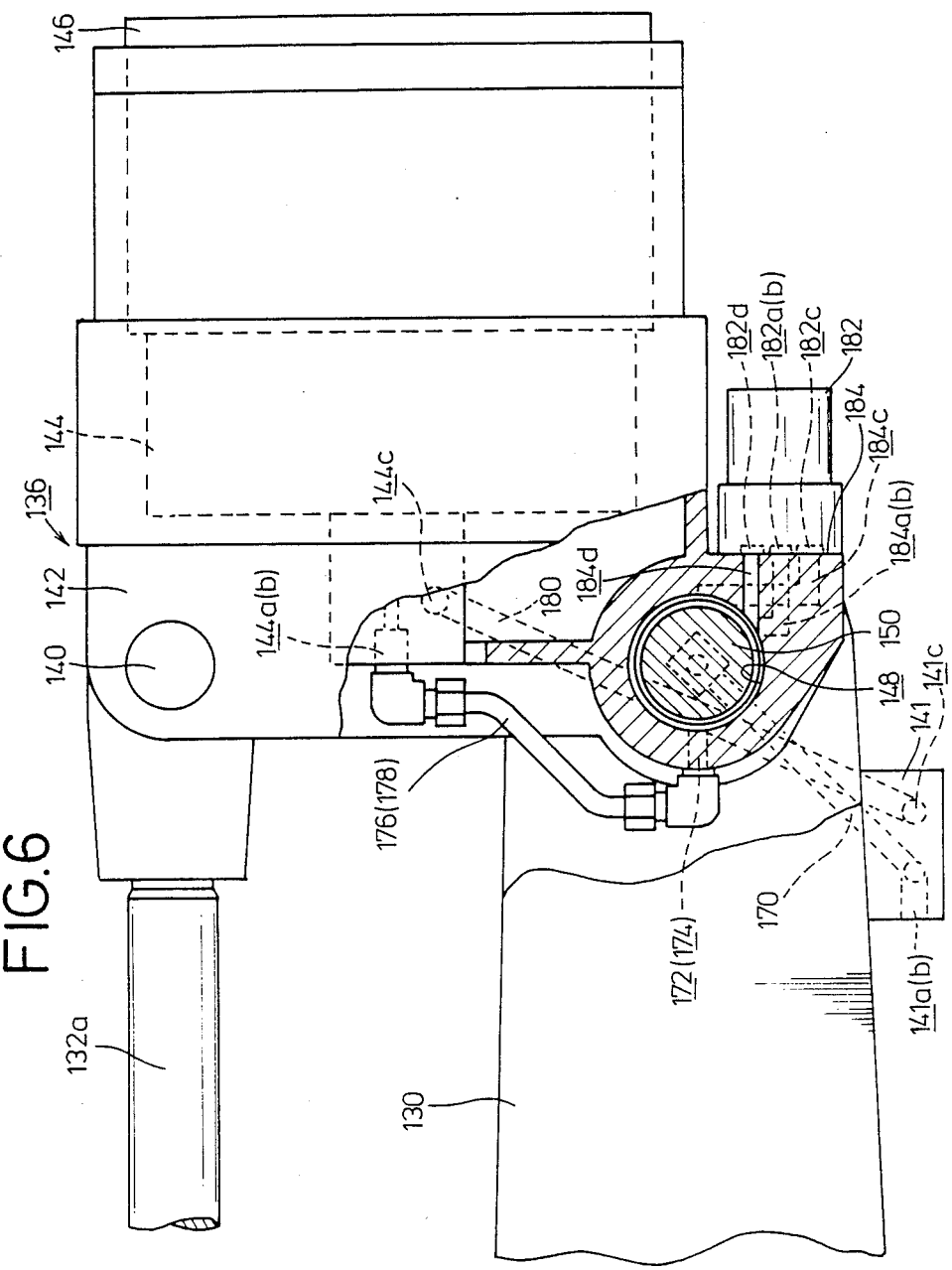
FIG. 6 is a fragmentary front elevational view, partly cut away and in cross section, of a wrist mechanism of the robot apparatus.
Figure 7:
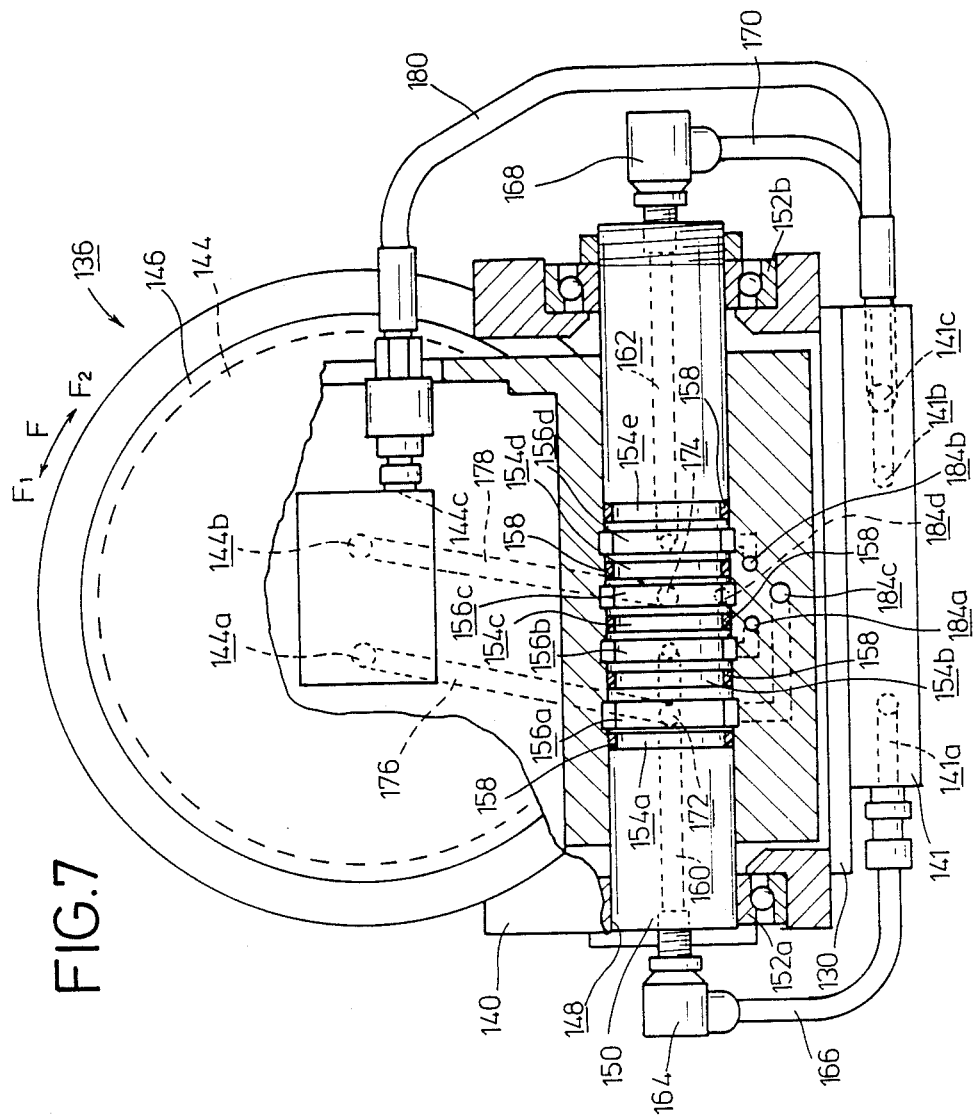
FIG. 7 is a side elevational view, partly cut away and in cross section, of the wrist mechanism shown in FIG. 6.

As shown in FIG. 6, the wrist mechanism 136 basically includes a bracket 142, a torque actuator 144 disposed as a rotative drive source in the bracket 142, and a rotatable body 146 rotatable in the bracket 142 by the torque actuator 144. The selected jig 26 is attached to the rotatable body 146. The torque actuator 144 is operable under fluid pressure. The torque actuator 144 has a first port 144a and a second port 144b for introducing and discharging a fluid under pressure, and a drain port 144c for draining any fluid that may remain in the torque actuator 144 (see also FIG. 7).

The bracket 142 engages the distal end of the arm 130. The bracket 142 has a hole 148 defined therein, and a support shaft 150 is fitted in the hole 148. The support shaft 150 has opposite ends projecting out of the hole 148 and rotatably supported in the bifurcated end of the arm 130 by means of bearings 152a, 152b, so that the wrist mechanism 136 is pivotably coupled to the arm 130.

The support shaft 150 has defined in its peripheral surface first peripheral grooves 154a through 154e spaced at intervals and second peripheral grooves 156a through 156d spaced at intervals, the second peripheral grooves 156a through 156d being wider than and alternating with the first peripheral grooves 154a through 154e. These peripheral grooves are kept hermetically in a fluid-tight manner. O-rings 158a are fitted respectively in the first peripheral grooves 154a through 154e. Passages 160, 162 are defined axially in and extend from the opposite ends of the support shaft 150. The passage 160 has one end communicating with the second peripheral groove 156b in the support shaft 150, and the passage 162 has one end communicating with the second peripheral groove 156d in the support shaft 150. The other end of the passage 160 is coupled via a pipe coupling 164 to one end of a pipe 166 with its other end connected to the passage 141a defined in the joint block 141 mounted on the arm 130. The passage 141a communicates with a pressure fluid source (described later).

Holes 172, 174 are defined at a spaced interval in the peripheral surface which defines the hole 148 in the bracket 142, the holes 172, 174 being directed toward the arm 130 as shown in FIG. 6. The holes 172, 174 have ends communicating with the second peripheral grooves 156a, 156c. The other end of the hole 172 is connected through a pipe 176 to the first port 144a of the torque actuator 144, and the other end of the hole 174 communicates with the second port 144b through a pipe 178. A pipe 180 is coupled to the drain port 144c of the torque actuator 144 and communicates with a tank (described later) through the passage 141c in the joint block 141.

The bracket 142 has a lower attachment seat 184 on which a directional control valve or servovalve 182 is mounted. The attachment seat 184 defines therein passages 184a through 184d communicating respectively with a pump port 182a, a tank port 182b, a first port 182c, and a second port 182d which are defined in the servovalve 182. The passage 184a communicates with the second peripheral groove 156b defined in the support shaft 150, the passage 184b with the second peripheral groove 156d, the passage 184c with the second peripheral groove 156a, and the passage 184d with the second peripheral groove 156c.

A fluid pressure circuit arrangement for actuating the wrist mechanism 136 is schematically illustrated in FIG. 8. A fluid pressure source 186 such as a pump is connected to the passage 141a in the joint block 141. Fluid from the passage 141b in the joint block 141 is discharged into a tank 188d, and fluid is drained from the drain port 144c in the torque actuator through the passage 144c into a tank 188b.

Operation and advantages of the robot apparatus 22 thus basically constructed will be described below.

As shown in FIG. 1, a selected jig 26 is mounted on the distal end of the wrist mechanism 136 of the robot apparatus 22, which is then operated to install a rear seat 18 in an automobile body 16.

The robot apparatus 22 operates as follows: As shown in FIGS. 2 and 3, the hydraulic motor 74 of the running mechanism 30 is driven to rotate the pinion 76 which meshes with the relatively long rack 52 secured to the base table 36. The pinion 76 now starts to move along the rack 52 in the direction of the arrow A1, for example. As the pinion 76 moves, the first running table 64, the second running table 68, the support plates 80, 82, and the mounting table 84 are displaced in unison in the direction of the arrow A1 along the guide rails 56a, 56b by the motor attachment plate 72 on which the hydraulic motor 74 is mounted. The robot 88 mounted on the mounting plate 84 is therefore also displaced in the direction of the arrow A1.

When the robot 88 is displaced a prescribed distance in the direction of the arrow A1, the kicker member 78 on the motor attachment plate 72 engages and triggers the limit switch 54. In response to a signal generated by the limit switch 54, the hydraulic motor 74 is stopped. The plates 70b, 70d attached to first ends of the first and second running tables 64, 68 abut against the stopper blocks 60b, 60d, respectively, to stop the robot 88 at a prescribed position.

In order to move the robot 88 in the direction of the arrow A2, the hydraulic motor 74 is reversed to move the pinion 76 in the direction of the arrow A2 along the rack 52. When the robot 88 reaches a predetermined position, the hydraulic motor 74 is stopped. The plates 70a, 70c on the first and second running tables 64, 68 engage the stopper blocks 60a, 60c, respectively, to stop the robot 88.

The hydraulic motor 106 mounted on the sliding member 102 of the robot 88 is actuated to cause the pinion 108 to rotate through the bevel gear (not shown) connected to the drive shaft of the motor 106 (see FIGS. 4 and 5). Since the pinion 108 meshes with the rack 98, the sliding member 102 is displaced in the direction of the arrow B along the guide members 100a, 100b, so that the robot 88 is displaced in the direction of the arrow B. By driving the turning motor 112 mounted on the base 110, the holder 118 is turned in the direction of the arrow C, and so is the attachment member 126 secured to the holder 118. The angular position where the holder 118 is to be stopped can be detected by the position detector 116.

The first cylinder 124 supported on the periphery of the holder 118 by the support members 120a, 120b is actuated to displace the piston rod 124a vertically in FIG. 4. Because the distal end of the piston rod 124a is joined to the intermediate portion of the arm 130, the arm 130 is angularly moved in the direction of the arrow D about the pin 128. In response to such angular movement of the arm 130, the wrist mechanism 136 is also angularly moved in the direction of the arrow D. The wrist mechanism is also turned in the direction of the arrow E by the piston rod 132a in response to actuation of the second cylinder 132.

The rotatable body 146 of the wrist mechanism 136 can be turned in the direction of the arrow F. More specifically, in FIG. 8, the fluid pressure supply (pump) 186 is actuated and the servovalve 182 is operated to bring the pump port 182a and the first port 182c into mutual fluid communication and also to bring the tank port 182b and the second port 182d into mutual fluid communication. The fluid supplied under pressure from the fluid pressure supply 186 now flows through the passage 141a in the joint block 141 and the pipe 166 into the passage 160 in the support shaft 150, from which the fluid is introduced via the peripheral groove 156b and the passage 184a into the pump port 182a of the servovalve 182. Since the pump port 182a communicates with the first port 182c, the fluid under pressure flows from the pump port 182a via the first port 182c, the passage 184c, the passage 156a, the second peripheral groove 156a, and the pipe 176 into the first port 144a of the torque actuator 144. The fluid under pressure thus applied to the first port 144a rotates the torque acutator 52 in the direction of the arrow F1, for example.

For rotating the torque actuator 144 in the direction of the arrow F2, the servovalve 182 is operated to communicate the pump port 182a with the second port 182d. The fluid under pressure then flows from the second port 182d through the passage 184d, the second peripheral groove 156c, and the pipe 178 into the second port 144b for thereby rotating the torque actuator 144 in the direction of the arrow F2.

According to the present invention, the passages for the fluid under pressure for rotating the wrist mechanism 136 in the direction of the arrow F are defined in the bracket 142 and the support shaft 150 of the wrist mechanism 136, and the directional control valve or servovalve 182 for selecting desired passages is mounted on the bracket 142 of the wrist mechanism 136. Therefore, the number of pipes required for supplying the fluid under pressure to the wrist mechanism 136 is reduced, and any necessary pipes can easily and accurately be mounted in place. Since only few pipes are exposed, the danger of pipe damage is small when the robot apparatus 22 installs the rear seat 18 in the automobile body 16.

The robot apparatus 22 can be moved in various directions as indicated by the arrows A through F. Therefore, the robot apparatus 22 can deliver various workpieces to desired locations.

While the rear seat 18 is being held by the jig 26 supported on the wrist mechanism 136, the robot apparatus 22 is moved in the direction of the arrow A1 by the running mechanism 30 in order to install the rear seat 18 in the automobile body 16. Since the rear seat 18 is relatively heavy and long, the distal end of the jig 26 holding the rear seat 18 tends to flex downwardly. If the rear seat 18 were to be installed in the automobile 16 with the distal end of the jig 26 being thus flexed, it would be highly difficult to install the rear seat 18 automatically in the automobile body 16 as the rear seat 18 would be inclined with respect to the automobile body 16.

With the present invention, however, the piston rod 132a of the second cylinder 132 is displaced in the direction of the arrow B1 in FIG. 4 to lift the distal end of the jig 26 about the support shaft 150 for thereby correcting the distal end of the jig 26 for the unwanted downward flexing thereof. Thus, the rear seat 18 can automatically and accurately be installed in the automobile body 16. The amount by which the piston rod 132a is displaced in the direction of the arrow B1 by the second cylinder 132 may preferably be input at the time of teaching the robot apparatus 22 depending on the weights of the jig 26 and the rear seat or workpiece 18.

After the rear seat 18 has been installed in the automobile body 16 being conveyed, the running mechanism 30 is driven to displace the robot apparatus 22 in the direction of the arrow A2 in preparation for a next installing cycle.

The base table 36, the running tables 64, 68, and the driver means 71 for driving the running talbes 64, 68 are disposed in the pit 11a defined in the floor 11, and the pit 11a is substantially covered with the shield plate 86. Therefore, the small space in the working station 10 can effectively be utilized. The robot apparatus 22 can easily be adjusted and repaired or otherwise serviced from within the pit 11a.

With the arrangement of the present invention, as described above, the wrist mechanism for supporting the jig for holding a component to be installed in or on a workpiece is mounted on the distal end of the arm of the robot apparatus, and the piston rod of the cylinder disposed substantially parallel to the arm is coupled to the wrist mechanism. Therefore, if the jig mounted on the wrist mechanism is lowered due to the weight of the component which the jig holds, the cylinder is actuated to lift the wrist mechanism to correct the jig for the distance it is lowered. Therfore, the component held by the jig on the wrist mechanism can be held in a desired position. As a result, the component can accurately and automatically be installed in or on the workpiece without being adversely affected by the weight and size of the component.

Since the wrist mechanism is swingable, it can easily install a component such as a front seat that should be positioned way back in the front portion of an automobile body.

Further according to the present invention, some of the fluid passages for supplying fluid under pressure to the rotative drive source disposed in the wrist mechanism and operable by fluid under pressure are defined in the bracket and the support shaft of the wrist mechanism. The bracket supports thereon the directional control valve for selecting fluid passages for the fluid to be supplied to the rotative drive source. Therefore, the number of exposed pipes required for supplying the fluid under pressure to the rotative drive source is reduced, and the procedure for mounting the required pipes is simplified and can be performed easily and accurately. With the few exposed pipes, the danger of pipe damage is reduced or avoided, and the appearance of the robot apparatus is improved.

Moreover, the running mechanism of the robot apparatus for displacing the robot in a prescribed direction is disposed in the pit defined in the floor and hence is substantially not exposed. The space in the working station in which the robot apparatus is located can effectively be utilized. The robot apparatus and other devices in the working station can be maintained or serviced with utmost ease. The efficiency of installing components or assembling products is increased.

The cylinder coupled to the wrist mechanism and the cylinder coupled to the arm may be replaced with ball screws and nuts threaded thereover.

Although a certain preferred embodiment has been shown and described, it should be understood that many changes and modifications may be made therein without departing from the scope of the appended claims.

What is claimed is:

1. A robot apparatus comprising:
   a robot including an attachment member;
   an arm swingably mounted on said attachment member;
   a wrist mechanism mounted on said arm;
   a connecting member interconnecting said attachment member and said wrist mechanism; and
   a running mechanism for displacing said robot in a prescribed direction;
   said connecting member including an actuator and a link coupled thereto for displacing said wrist mechanism with said actuator, wherein said wrist mechanism includes a bracket coupled to said arm, rotative drive source disposed in said bracket, a rotatable body rotatable by said rotative drive source, and a support shaft by which said bracket is supported on said arm, said support shaft and said bracket having fluid passages defined therein for supplying fluid under pressure to actuate said rotative drive source.

2. A robot apparatus according to claim 1, further including a directional control valve for selecting desired ones of said fluid passages, and means on said bracket for attaching said directional control valve.

3. A robot apparatus according to claim 2, wherein said attaching means has passages communicating respectively with ports of said directional control valve.

4. A robot apparatus according to claim 2, wherein said directional control valve comprises a servovalve.

5. A robot apparatus according to claim 1, wherein said rotative drive source comprises a torque actuator operable by fluid under pressure.

6. A robot apparatus according to claim 1, wherein said support shaft is fitted in said bracket, said support shaft having a plurality of grooves defined therein, said bracket having a plurality of passages defined therein and communicating with said grooves, said grooves and said passages jointly providing said fluid passages.

7. A robot apparatus according to claim 6, wherein said grooves are kept hermetically in a fluid-tight manner.

8. A robot apparatus according to claim 1, wherein said support shaft is rotatably coupled to said arm.

9. A robot apparatus according to claim 1, wherein said actuator includes a cylinder and said link includes a piston rod of said cylinder.

10. A robot according to claim 1, further including an actuator connected to an intermediate portion of said arm and mounted on said robot, and a moving member movable by said actuator for swinging said arm.

11. A robot apparatus according to claim 1, further including a rotative drive source, a holder rotatable by said rotative drive source, said attachment member being mounted on said holder, and a position detector for detecting an angular position of said holder to stop the holder in a desired position.

12. A robot according to claim 1, wherein said running mechanism includes a base table, at least one displaceable running table, drive means for moving said at least one displaceable running table, and a mounting member by which said robot is mounted on said at least one displaceable running table, said base table, said at least one displaceable running table and said driver means being disposed in a pit defined in a floor on which said robot apparatus is disposed.

13. A robot apparatus according to claim 12, wherein said running mechanism further includes a pair of guide rails extending in a prescribed direction on said base table, and wherein said at least one displaceable running table comprises a pair of running tables each being displaceable along one of said pair of guide rails.

14. A robot apparatus according to claim 12, further including a shield member closing an upper open end of said pit and lying substantially flush with said floor.

15. A robot apparatus according to claim 12, wherein said drive means includes a rotative drive source mounted on one of said at least one displaceable running tables adjacent a side of said base table and having a drive shaft, a pinion coupled to said drive shaft, and a rack fixed to said base table and meshing with said pinion.

16. A robot apparatus according to claim 15, wherein said rotative drive source comprises a fluid pressure motor operable by fluid under pressure.

17. A robot apparatus according to claim 12, wherein said running mechanism further includes leveler bolts by which said base table is positioned substantially horizontally.

18. A robot apparatus according to claim 12, wherein said at least one displaceable running table comprises a pair of running tables, and wherein said running mechanism further includes a pair of support plates each being vertically mounted on one of said pair of running tables, said mounting member being coupled to said running tables by said support plates.

19. A robot apparatus comprising:
    a robot including an attachment member;
    an arm swingably mounted on said attachment member;
    a wrist mechanism mounted on said arm;
    a connecting member interconnecting said attachment member and said wrist mechanism; and
    a running mechanism for displacing said robot in a prescribed direction;
    said connecting member including an actuator and a link coupled thereto for displacing said wrist mechanism with said actuator, wherein said actuator includes a cylinder, said link includes a piston rod of said cylinder and said running mechanism includes a base table, at least one displaceable running table, drive means for moving said at least one displaceable running table, and a mounting member by which said robot is mounted on said at least one displaceable running table, and wherein said base table, said at least one displaceable running table and said drive means are disposed in a pit defined in a floor on which said robot apparatus is disposed, said running mechanism including leveler bolts by which said base table is positioned substantially horizontally.

20. A robot apparatus according to claim 19, wherein said running mechanism further includes a pair of running tables and a pair of support plates one said plate being vertically mounted on each said running table, said mounting member being coupled to said running tables by said support plates.

* * * * *